J. C. WELLS.
GLASSES.
APPLICATION FILED DEC. 23, 1912.
1,098,418.
Patented June 2, 1914.
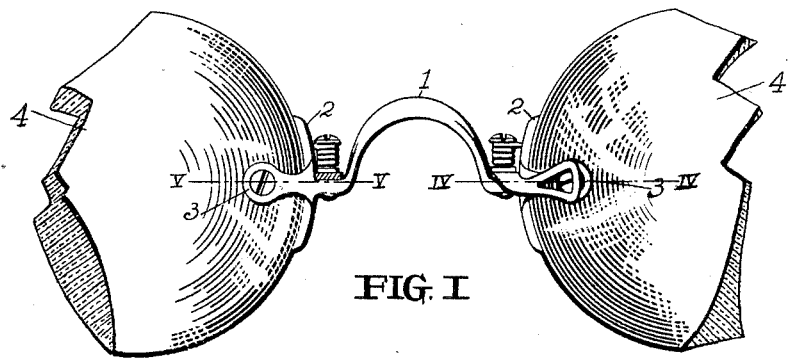
FIG. I
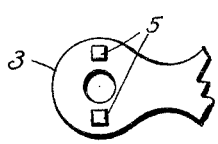
FIG. II
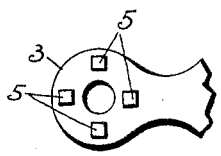
FIG. III
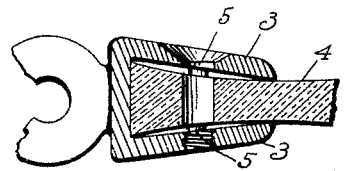
FIG. IV
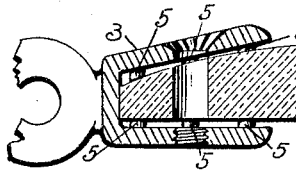
FIG. V
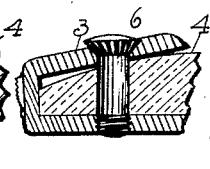
FIG. Vª
PRIOR ART
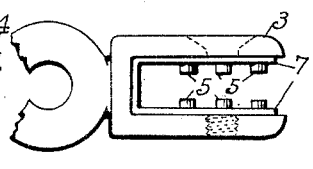
FIG. VI
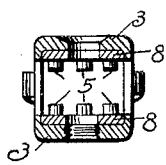
FIG. VII
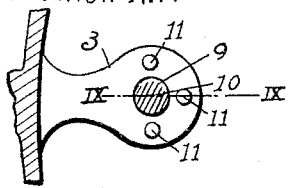
FIG. VIII
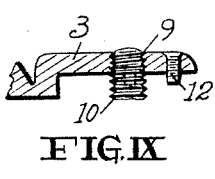
FIG. IX
WITNESSES:
Joseph J. Demers
Esther M. Sheridan
INVENTOR
JOEL C. WELLS
By
H. H. Stytt   H. K. Parsons
ATTORNEYS

UNITED STATES PATENT OFFICE.

JOEL C. WELLS, OF SOUTHBRIDGE, MASSACHUSETTS.

GLASSES.

1,098,418.   Specification of Letters Patent.   Patented June 2, 1914.

Application filed December 23, 1912. Serial No. 738,258.

*To all whom it may concern:*

Be it known that I, JOEL C. WELLS, a citizen of the United States, residing at Southbridge, in the county of Worcester and State of Massachusetts, have invented certain new and useful Improvements in Glasses, of which the following is a specification.

My invention relates to improvements in glasses and has particular reference to improved means of securing in place the lenses thereof.

The leading object of my invention is the provision of an improved construction of lens attachment which may be readily adapted to satisfactorily fit varying shapes of lenses, and which will act as a tension member increasing the engagement of the lens screw with the lens straps and preventing it from backing out.

A further object of my invention is the provision of a lens attachment which will permit of adjustment to some degree to accommodate various thicknesses of lenses and which can also be adapted to satisfactorily engage varying shapes of lenses to securely hold the same in place.

Other objects and advantages of my improved construction should be readily apparent by reference to the following specification taken in connection with the accompanying drawing forming a part thereof, and it will be understood that I may make any variations in the specific details of construction illustrated and hereinafter described falling within the scope of my claims without departing from or exceeding the spirit of my invention.

Figure I represents a view of an eyeglass mounting embodying my invention. Fig. II represents a fragmentary view of one of the lens clips. Fig. III represents a similar view of a slightly modified construction of clip. Fig. IV represents a sectional view on the line IV—IV of Fig. I. Fig. V represents a sectional view of the line V—V of Fig. I illustrating my clip as secured to a plano convex lens. Fig. V$^a$ represents a view of an ordinary clip engaging the lens shown in Fig. V. Fig. VI represents a side elevation of a slight modification of my invention. Fig. VII represents a sectional view of a further modification embodying the idea of Fig. VI. Fig. VIII represents a fragmentary view of another form of my invention, and Fig. IX represents a sectional view of the line IX—IX of Fig. VIII.

In the drawings, in which similar characters of reference are employed throughout to denote corresponding parts in the several views, the numeral 1 designates an eyeglass bridge bearing at each end a lens clip comprising a strap portion 2 and a pair of clip ears 3 adapted to rest on opposite sides of a lens 4. It will be noted that in the pair of glasses shown in Fig. I the right hand lens is a double concave while the left hand lens is a plano convex.

It is customary in the construction of lens clips to form the same with the ears 3 disposed in parallel relation and having flat or plain inner faces for engaging the lens. While this shape of strap will satisfactorily engage plano lenses when fitted upon either concave or convex lenses, the inner faces of the clip ears naturally will not contact throughout with the face of the lens and consequently a satisfactory bearing can not be obtained, while the liability of marring the precious metal of which these parts is usually composed tends to deter the person mounting the lenses from bending and twisting of the clip ears to cause the same to fit correctly against the lenses, and as a result of these facts lenses are very frequently incorrectly or loosely mounted. It is the purpose of my invention to obviate these difficulties in the mounting of lenses by providing a clip which will have a plurality of inwardly projecting bearing points for satisfactorily engaging and gripping the lens in such manner as to resist to the greatest possible extent any twisting or loose movement thereof. It is a further purpose to provide springy or tension members by holding the ears distant from the lens which will increase the hold of the lens screw and prevent it from backing out especially when the head of the lens screw is corrugated as in Fig. V— a very important consideration of the opticians' art.

By reference to Figs. II and III it will be seen that I provide a plurality of inwardly projecting contact points or lugs 5, in Fig. II, I have shown but two of these lugs, while in Fig. III, I have shown four of the same. It will be understood, however, that I do not wish to limit myself to any particular number. The use and advantage of these lugs should be clearly apparent by reference to Figs. IV and V. It will be observed that in Fig. IV, I use two of these points on each clip ear, the two clip ears being bent into converging relation to bear their outer ends against the lens 4, while the points 5 intermediate the length of the ears are cut off to fit the intermediate portion of the lens which would not be engaged by an ordinary clip ear on account of the concave curvature of the lens and the plain face of the clip ear. It will thus be seen that in the case of the lens shown in Fig. IV instead of the same being merely gripped by the ends of the clip ears it is also gripped by the bearing members 5 at the sides of the lens screw and the plurality of independent contact points engaging the lens satisfactorily holds the same against any rocking movement on the lens screw, correctly secures the same in position within the clip, and provides a springy section which will increase the tension on the lens screw when it is screwed up.

In Fig. V, I have illustrated the use of my clip on a plano convex lens, the lower ear having the four points 5 bearing against the plain face of the lens, while in the case of the upper ear the two middle points 5 as shown in Fig. III are considerably reduced in length, while the inner and outer points bear against the lens, there thus being four points each tightly bearing against the lens on each side to grip the lens and hold it in place. The advantage of my improved construction will perhaps be most readily understood by a comparison of Fig. V embodying my structure with Fig. V$^a$ which illustrates the customary way of mounting lenses of this type, from which it will be seen that the upper clip ear bears against the lens only at point 6, thus putting the entire clamping strain on this one portion of the lens and having a much greater tendency to break the lens than has my improved structure which distributes the strain over a plurality of points, and also that there is no spring in the strap which may be brought up when the lens screw is tightened up.

In Fig. VI, I have shown a side elevation of a slightly modified construction of my invention in which the points 5 instead of being integral with the clip ears are carried by a suitable backing 7 adapted to fit within an ordinary clip and form a liner therefor from which the points 5 extend inwardly. This liner and the points carried thereby may be formed either from metal or from rubber or other yielding material, as desired, if formed of sufficiently yielding material the points 5 automatically accommodating themselves to the curvature of the lens on which the clip is secured.

Fig. VII shows a slight variation of Fig. VI in which the clip ears have the inwardly extending flanges 8 which embrace the liner and thus aid in retaining the liner in position and concealing the same.

In Figs. VIII and IX, I have illustrated another embodiment of my invention in which the clip ear in addition to being pierced by the aperture 9 for receiving the lens screw 10 is pierced with a plurality of apertures 11 adapted to receive the screws or pins 12, and in the use of this form of my invention the points 12 may either be inserted in the apertures 11 before the clip is engaged on a lens or the clip may first be secured on a lens and then the points 12 inserted in the apertures 11 and adjusted until they correctly bear against the lens to grip the same and supplement any bearing of the clip ears thereagainst as may be desired.

From the foregoing description taken in connection with the accompanying drawings the construction and advantages of my improved lens clip should be readily apparent, and it will be seen that I have provided a clip embodying as its essential features a plurality of independent inwardly extending bearing points for engaging a lens to distribute the strain thereover, to provide additional tension on the lens screw, and to satisfactorily fit varying shapes of lenses and securely hold the same in position within the lens clip. It will further be observed that I have provided bearing points which may be readily adjusted according to the peculiar shape of the lens to be secured within the clip and by cutting down of which points a clip may be adapted to engage thicker lenses than could otherwise be secured in position therewithin.

I claim:

1. A lens clip including a plurality of separate and independently adjustable portions for engaging the face of a lens.

2. A lens clip including a plurality of spaced members for clampingly engaging the same face of a lens and a single means for drawing said members into clamping engagement with the face of the lens.

3. A lens clip ear having a plurality of distinct bearing points projecting from the inner face thereof.

4. The combination with a clip ear having a lens screw receiving aperture formed therethrough, of a plurality of relatively adjustable bearing points projecting from the inner face of the clip ear and spaced from the screw receiving aperture therein.

5. A lens clip comprising a pair of clip ears each having a plurality of contacts projecting therefrom, the contacts on the two ears being alined with each other to clampingly engage the lens therebetween without leverage at a plurality of points.

In testimony whereof I affix my signature in presence of two witnesses.

JOEL C. WELLS.

Witnesses:
 JOSEPH J. DEMARS,
 DUDLEY H. CLARKE.

Copies of this patent may be obtained for five cents each, by addressing the "Commissioner of Patents, Washington, D. C."